July 31, 1928.
H. A. SELAH
1,678,879
FITTING FOR TUBULAR SWITCHBOARDS
Filed Oct. 23, 1925
4 Sheets-Sheet 1
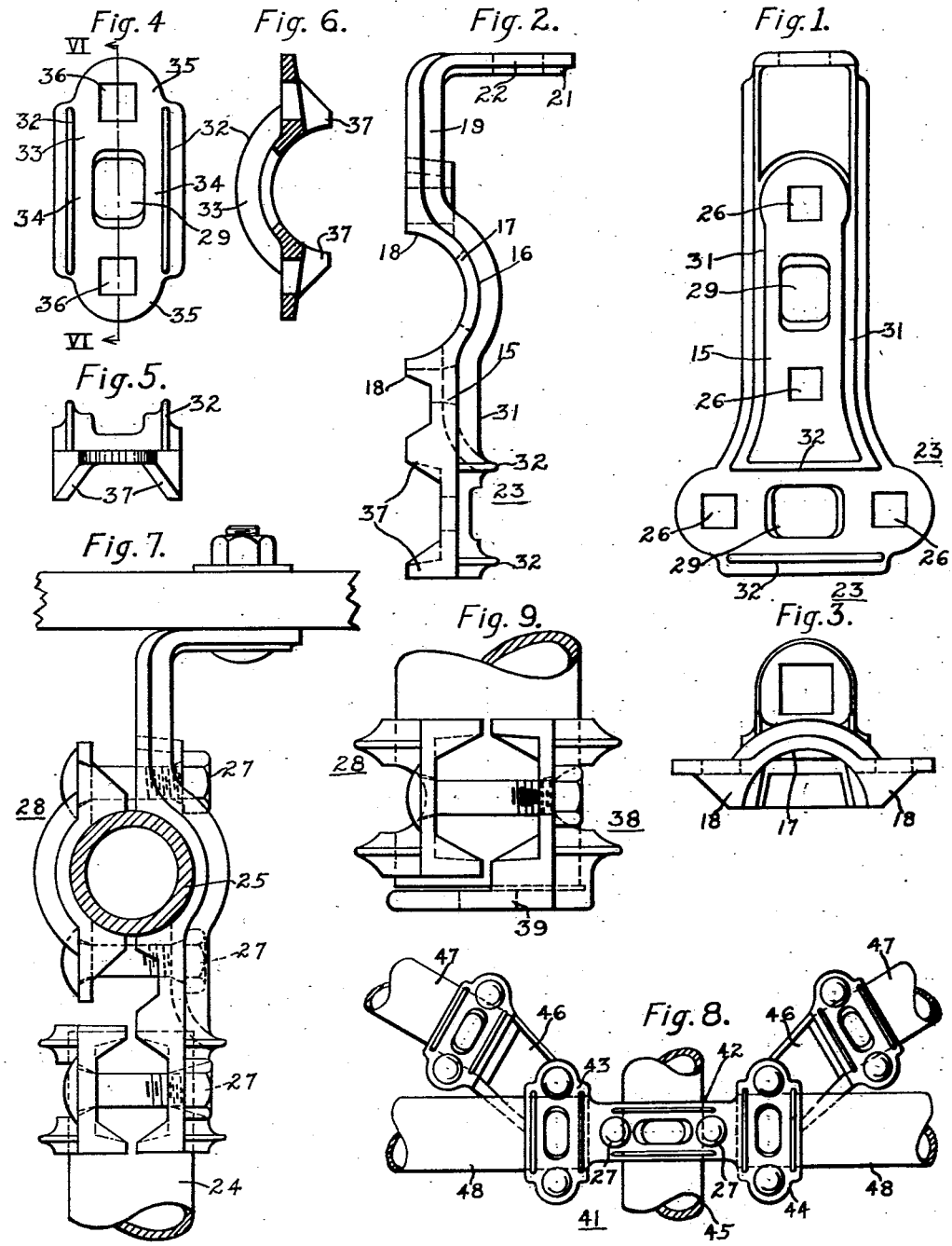
WITNESSES:
R. S. Williams
INVENTOR
Howard A. Selah
BY
Wesley S. Carr
ATTORNEY July 31, 1928.  1,678,879
H. A. SELAH
FITTING FOR TUBULAR SWITCHBOARDS
Filed Oct. 23, 1925   4 Sheets-Sheet 2
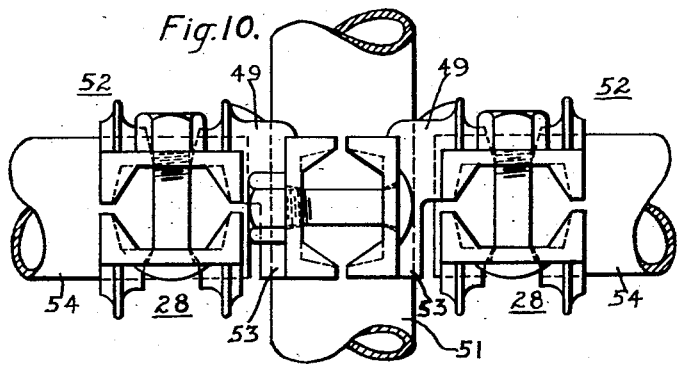
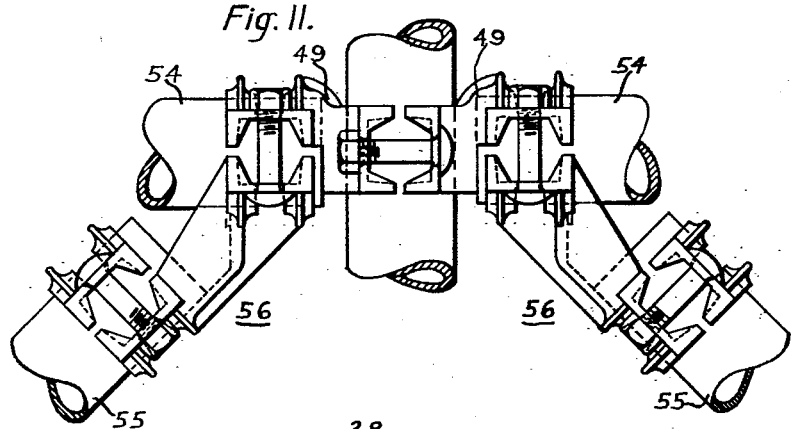
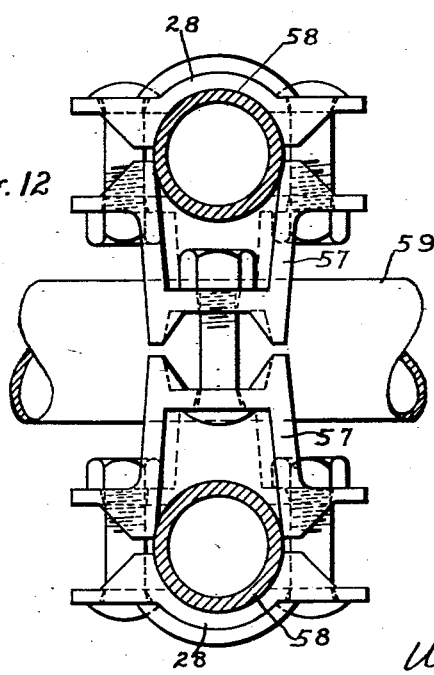
WITNESSES:
INVENTOR
Howard A. Selah
BY
Wesley G. Carr
ATTORNEY July 31, 1928.

H. A. SELAH 1,678,879

FITTING FOR TUBULAR SWITCHBOARDS

Filed Oct. 23, 1925

WITNESSES:
R. S. Williams

INVENTOR
Howard A. Selah

BY
Wesley G. Carr
ATTORNEY

July 31, 1928.

H. A. SELAH 1,678,879

FITTING FOR TUBULAR SWITCHBOARDS

Filed Oct. 23, 1925     4 Sheets-Sheet 4

WITNESSES:
R. S. Williams

INVENTOR
Howard A. Selah
BY
Wesley G. Carr
ATTORNEY

Patented July 31, 1928.

1,678,879

UNITED STATES PATENT OFFICE.

HOWARD A. SELAH, OF HOMEWOOD, PENNSYLVANIA, ASSIGNOR TO WESTINGHOUSE ELECTRIC AND MANUFACTURING COMPANY, A CORPORATION OF PENNSYLVANIA.

FITTING FOR TUBULAR SWITCHBOARDS.

Application filed October 23, 1925. Serial No. 64,479.

My invention relates to fittings for metal frame work and particularly to tubular frame work such as is used in the electrical industry for supporting various forms of electrical apparatus. Frame work of this character is used in the construction of tubular frame-work switch boards and net work of structural character commonly used in high-tension and heavy-duty transformer stations.

An object of my invention is to provide a series of fittings having general characteristics which are capable of connecting tubular frame structures in any desired position and by the use of a minimum number of different fittings.

Another object of my invention is to provide a frame work fitting that may be connected in operative position with the expenditure of a minimum amount of time and effort.

Another object of my invention is to provide a frame work fitting, that, although relatively light in weight, is entirely adequate to withstand the stresses incident to large and complicated net-work structures.

Another object of my invention is to provide a frame work fitting that shall be adaptable to a variety of applications and which shall require a minimum number of different fittings and patterns for making the fittings, and, at the same time, shall meet all the requirements for joining tubular sections to one another at various angles and for securing different sizes of tubular sections to one another.

These and other objects that will be made apparent throughout the further description of my invention are attained by means of the fittings hereinafter described and illustrated in the accompanying drawing, wherein—

Figures 1, 2 and 3 are plan, elevational and end views, respectively, of a fitting embodying features of my invention that is adapted to connect two tubular sections at right angles to each other and attach them to a wall or panel of a switch board.

Figs. 4 and 5 are plan and end views of a clamp or cap fitting designed to complete the fitting shown in Figs. 1 and 2 and in fact to complete any other of the series of fittings to be hereinafter described.

Fig. 6 is a longitudinal section through the cap fitting shown in Fig. 4 taken on the line VI—VI of that figure.

Fig. 7 is an elevational view showing the fittings illustrated in Figs. 1 to 6 inclusive, in assembled relation with tubular sections for supporting the sections in the same plane and at right angles to one another.

Fig. 8 illustrates two modified forms of fittings constituting a connection for five tubular sections disposed in the same plane, two of the sections being angularly disposed with respect to two axially aligned sections and the latter sections being disposed at right angles to a fifth section.

Fig. 9 illustrates a base fitting associated with a standard clamp or cap fitting and securing the end of a tubular section to a floor or to a wall, the tubular section being perpendicular to the floor or wall.

Fig. 10 illustrates a modified form of fitting for connecting a tubular section between the ends of two aligned tubular sections disposed in the same plane and extending at right angles to the first section.

Fig. 11 illustrates fittings similar to those shown in Fig. 10, but, in the place of the standard cap sections, modified forms of fittings are used to support tubular sections at acute angles with respect to the axially aligned section.

Fig. 12 illustrates modified forms of fittings for supporting a tubular section at right angles to and between two parallel tubular sections.

Figure 13:
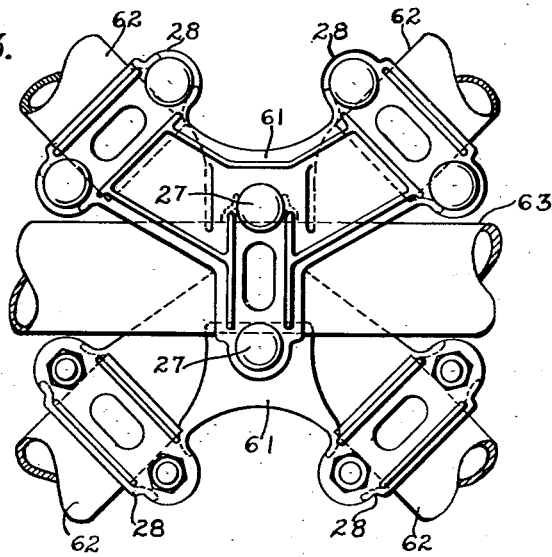
Fig. 13 illustrates a pair of modified fittings that, in conjunction with four standard cap fittings, serve to connect four tubular sections in the same plane with a fifth tubular section to which the other sections are angularly related.

The drawings herein do not include a complete line of fittings but are intended to illustrate, in a general way, the variety of structure forms that may be connected with but a few different fittings. Many of the fittings are interchangeable and may be adapted to a variety of applications. For instance, the arrangements of tubular sections illustrated may be accomplished by ten different fittings and, by proper combinations of different fittings, a greater variety of arrangements may be secured with the same fittings.

Referring to Figs. 1 to 6, inclusive, wherein a specific form of fittings and a standard form of cap fittings are illustrated, it will be found that certain details of construction are embodied in all the fittings illustrated in Figs. 1 to 16. The details, however, will be described in connection with the fittings illustrated in the above noted figures.

The fitting illustrated in Figs. 1 to 3, comprises a main body portion 15 having an arcuate portion 16 provided with a semicircular gripping surface 17 adapted to partially surround a tubular frame-work section, such as a metal tube. It will be noted that the gripping surface 17 extends beyond the plane of the body 15 and terminates in four gripping lugs 18, the purpose of which will hereinafter appear.

At one end of the arcuate section 16, the fitting is provided with an extension 19 that terminates in an angular foot 21 having a square perforation 22 therein for receiving the square portion of a carriage bolt which serves to secure the fitting to a wall or switchboard panel.

The body 15 terminates at the other end in a clamp structure 23 similar to the standard cap fitting illustrated in Figures 4 to 6, and which serves, in combination with a standard cap fitting, to connect a tubular fitting 24, Fig. 7, at right angles to a tubular fitting 25.

Square perforations 26 are provided on opposite sides of the arcuate portion 16 for receiving standard carriage bolts 27 as illustrated in Fig. 7, wherein the bolts serve to secure the standard cap fitting 28 in clamping engagement with the tubular section 25.

The arcuate portion 16 is provided with an opening 29 for increasing the flexibility of the fitting at the point of contact with the tubular section in order that the fitting may more readily accommodate itself to any imperfections or variations in the surfaces of the tubing. The opening also serves to reduce the weight of the fitting and it will be observed that the fitting is of relatively thin cross-section and is re-enforced by ribs or flanges 31 and 32. The clamping portion 23 of the fitting illustrated in Figs. 1 to 3, is also provided with an arcuate gripping surface 17 and perforations for receiving carriage bolts 27 and an opening 29 for the purposes previously described.

The standard cap fitting illustrated in Figs. 4, 5 and 6, comprises an arcuate portion 33 which, because of the opening 29, constitutes two parallel semi-circular bands 34 that are connected by flange members 35 provided with square openings 36 for receiving carriage bolts, and which merge into the bands which are spaced from the extremities thereof, as clearly illustrated in Figs. 5 and 6. The extremities of the arcuate bands 34 constitute four lugs 37 that are placed under compression when the flange of one clamp member or fitting is moved toward the flange of a cooperating fitting and will, therefore, press into engagement with the surface of the tubular section while the arcuate bands 34 are placed under tension, which draws them also into engagement with the surface of the tubular section. The cap fitting just described is also provided with re-enforcing flanges 32 in order that the fitting may be of maximum strength with a minimum of metal.

By reason of the construction of the fittings as above described, the minimum amount of metal is required to constitute the flanges for the attaching bolts because the lugs 37, being under compression and tapering in the manner illustrated, serve to adequately support the flanges and prevent distortion thereof under the most severe operating conditions.

The fittings are preferably made of malleable iron and, as designed and constructed, relatively small quantities of material are used. The fittings are of such strength that, under actual operating and test conditions, they withstand stresses of such severity that the attaching bolts will be fractured before any injury to, or appreciable distortion of, the fitting will occur.

Fittings for tubular sections have heretofore been made with flanges having their adjacent faces extended in the plane of the extremities of the curved portion, with the result that distortion of the flange occurred even though the thickness thereof was considerably greater than the thickness of the flanges illustrated in the accompanying drawing. This clearly indicates the advantage of having the flange merged into the arcuate portion of the gripping bands at a point spaced from the extremity thereof in order that the extremity shall serve to support and reenforce the flange. It has also been found that clamps constructed as illustrated have greater gripping power than fittings having flanges disposed substantially in the plane of the end of the gripping portion of the fitting.

The end 23 of the fitting shown in Figs. 1 to 3, as previously stated, is similar in design to the standard cap fitting illustrated in Figs. 4 to 6, the fitting being provided with the compression lugs 37 and re-enforcing flanges 32.

It will be noted that of the fittings illustrated in Figs. 1 to 16, inclusive, have the same characteristic design with respect to the actual clamping portion of the fitting. The fittings, wherever possible, are provided with re-enforcing flanges and the body portion connecting two clamping portions is designed to meet the requirements of the particular application for which it is intended; that is, the body is designed to support the clamping portions in certain angular relations and to afford the maximum strength in order to resist distorting stresses.

In Fig. 9, a modified form of fitting 38 is illustrated which comprises a clamping section similar to a standard cap fitting 28 except that it is provided with a circular disk at one edge thereof having a square perforation 39 for receiving an attaching bolt. This form of fitting, in combination with a standard cap fitting, serves to secure a tubular section perpendicular to the floor.

In Fig. 8, a modified fitting 41 is illustrated, which consists of a central clamping portion 42 having, at its ends, clamping portions 43 and 44 similar in construction to a standard cap fitting. The fitting 41 is attached to a tubular section 45 by means of a standard cap fitting on the opposite side of the tubular section which is secured by bolts 27. A pair of angular fittings 46, each having a clamp section corresponding to the cap fitting 28 at the ends thereof, serves, with the assistance of two standard cap fittings, to connect two diagonal tubular sections 47 to two axially aligned tubular sections 48 and to the fitting 41.

Referring to Fig. 10, two modified fittings 49, identical in design, are designed to be clamped to each other and to a vertical tubular section 51, each fitting comprising a clamp portion 52 that is disposed at right angles to a clamp portion 53, and axially aligned tubular sections 54 are secured thereto by means of a pair of standard clamp fittings 28.

Fig. 11 illustrates the manner in which diagonal braces 55 may be connected to the organization shown in Fig. 10 by substituting modified forms of fitting 56 for the standard cap fittings 28 shown in Fig. 10. The angle of sections 55 with respect to the sections 54 may be varied by using fittings similar to the fittings 56 but in which the clamping sections thereof are disposed at a different angle.

Fig. 12 illustrates a pair of modified fittings 57 for clamping a pair of parallel tubular sections 58 in spaced relation and on opposite sides of a tubular section 59 extending in a plane at right angles to the plane of the sections 58. Cap fittings 28 cooperate with the fittings 57 for completing the connection unit.

In Fig. 13, I have shown a pair of modified fittings 61, each having three semi-circular clamping sections angularly disposed with respect to one another and in conjunction with four standard cap fittings 28 to connect the ends of four tubular sections 62 to a fifth tubular section 63 extending in the same plane and between pairs of the tubular section 62, as indicated. It will be noted that the fittings 61 are disposed on opposite sides of the tubular section 63 and are clamped by means of carriage bolts 27.

Figure 14:
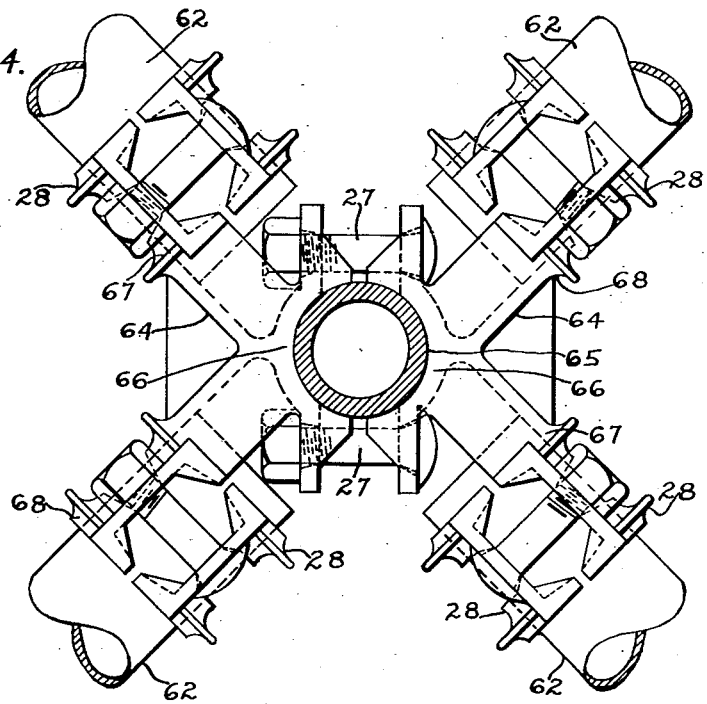
Fig. 14 illustrates a modified form of fitting, two of which are in conjunction with four standard cap fittings, serving to support four angularly disposed sections in the same plane and in a plane at right angles to a fifth tubular section between the ends of the other sections.

Fig. 14 illustrates a pair of modified fittings 64 for clamping four tubular sections 62 in the same plane and radially about a fifth tubular section 65 that extends perpendicularly to the plane of the other tubular section, as indicated. Each fitting 64 is provided with three arcuate clamping portions 66, 67, and 68. The clamping portions 66 are connected to one another by means of bolts 27, and the tubular sections 62 are secured to the clamping section 67 and 68 by means of standard cap fittings 28 in the usual manner.

Figure 15:
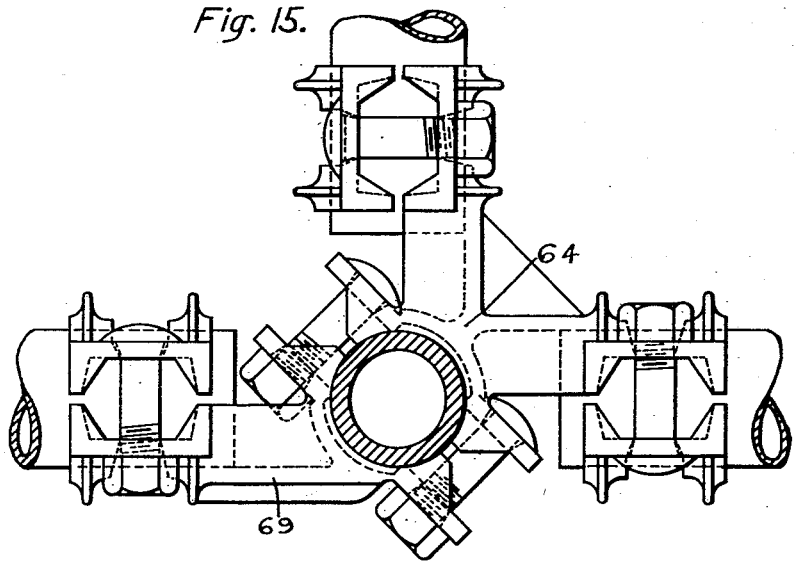
Fig. 15 shows modified forms of fittings for supporting three angularly disposed tubular sections in the same plane and at right angles to a fourth tubular section.

A further modified fitting 69 is illustrated in Fig. 15 and is shown connected to a fitting 64 similar to those illustrated in Fig. 14. This figure illustrates how various combinations of tubular sections may be connected by combining different types of fittings.

Figure 16:
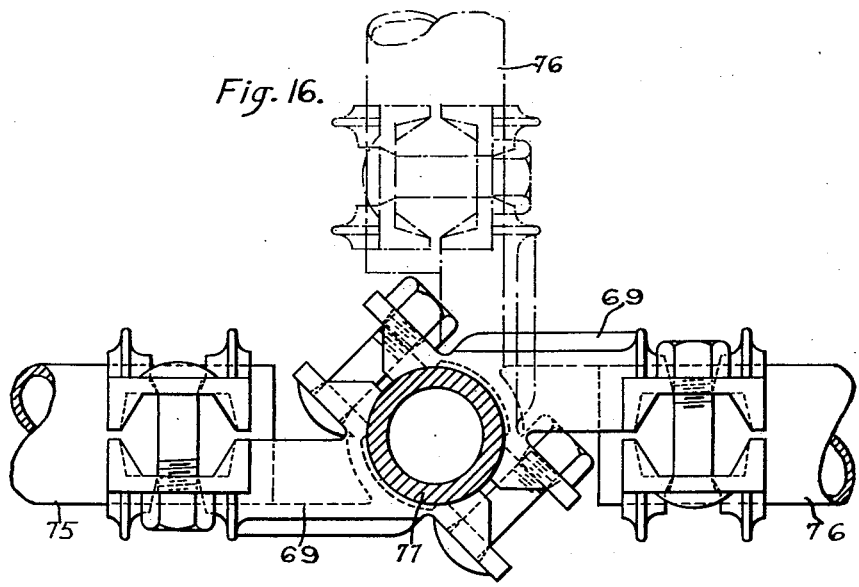
Fig. 16 illustrates a modified form of fitting, two identical fittings serving either to support two tubular sections in axial alignment or at right angles to each other.

Fig. 16 illustrates the manner in which two similar fittings 69 may be used to connect two tubular sections 75 and 76 in axial alignment and on opposite sides of a tubular section 77 that is perpendicular to a plane of the section 75. By reversing the position of the right hand fitting 69, the tubular sections 76 may be disposed at right angles to the tubular section 75 but in the same plane, as shown in broken lines.

The fittings herein illustrated are representative of a series of fittings that, by proper combination, are capable of supporting tubular sections in any combination or relative positions required in switchboard or network structures.

By making the curvature of the clamping sections of one fitting different, tubular sections of different diameters may be joined. The fittings, therefore, may be adapted to the various commercial sizes of metal tubing. By reason of the design of the clamping portions of the fittings and by reason of the fact that the fittings are made preferably of malleable iron, the fittings readily accommodate themselves to the contour of the tubular sections and, regardless of variations and irregularities in the diameters of the tubular sections, the fittings conform to the surfaces of the sections and tightly and rigidly connect them.

While I have described and illustrated several embodiments of my invention, it will be apparent to those skilled in the art that various changes, modifications, substitutions, additions and omissions may be made in the apparatus illustrated without departing from the spirit and scope of the invention, as set forth in the appended claims.

I claim as my invention:

1. A frame-work fitting comprising a pair of clamping members having arcuate-clamping surfaces for substantially encircling a cylindrical member, each clamping member being provided with perforate bolt-receiving flanges constituting a part of the clamping surface and having compression lugs extending beyond the adjacent faces of the flanges and disposed in spaced relation on each flange for engaging the surface of the cylindrical member at a point between the flanges.

2. A frame work fitting comprising a pair of clamping members for substantially encircling a cylindrical member, the said members each comprising a pair of spaced arcuate clamping bands connected adjacent their extremities by perforate bolt-receiving flanges, the said flanges merging into the bands at a point spaced from the extremities thereof whereby the extremities are placed under compression when opposite flanges are drawn toward one another.

In testimony whereof, I have hereunto subscribed my name this 12th day of October, 1925.

HOWARD A. SELAH.